United States Patent [19]
Holloway

[11] Patent Number: 5,361,994
[45] Date of Patent: Nov. 8, 1994

[54] APPARATUS AND METHOD FOR PREPARATION FOR SEPARATION, RECOVERY, AND RECYCLING OF MUNICIPAL SOLID WASTE AND THE LIKE

[76] Inventor: Clifford C. Holloway, 2121 E. Lakeshore, Baton Rouge, La. 70808

[21] Appl. No.: 23,051

[22] Filed: Feb. 25, 1993

Related U.S. Application Data

[63] Continuation-in-part of Ser. No. 692,550, Apr. 29, 1991, Pat. No. 5,190,226.

[51] Int. Cl.$^5$ .............................................. B02C 23/24
[52] U.S. Cl. ........................................ 241/23; 241/24; 241/66; 241/DIG. 38
[58] Field of Search ...................... 241/23, 24, 17, 66, 241/163, DIG. 30, DIG. 38, 82.1

[56] References Cited

U.S. PATENT DOCUMENTS

| | | | |
|---|---|---|---|
| 3,666,186 | 5/1972 | Hoffman | 241/163 X |
| 4,974,791 | 12/1990 | Placzek | 241/23 X |

*Primary Examiner*—Douglas D. Watts
*Attorney, Agent, or Firm*—John C. Garvin, Jr.; Harold W. Hilton

[57] ABSTRACT

Apparatus and method for separation, recovery, and recycling municipal solid waste and the like by introducing solid waste materials into a pressure vessel having a rotatable section. The vessel is disposed for subjecting the waste material to heat and pressure while simultaneously applying an extruding action to the solid waste material. The extruding action is achieved by a rotatable extruder mechanism carried in the pressure vessel and rotated in response to the rotating section thereof. The rotation forces the processed solid waste material through a pair of constricted areas before the waste material is expelled from the pressure vessel by rotation of the extruder mechanism.

18 Claims, 3 Drawing Sheets

U.S. Patent    Nov. 8, 1994    Sheet 2 of 3    5,361,994
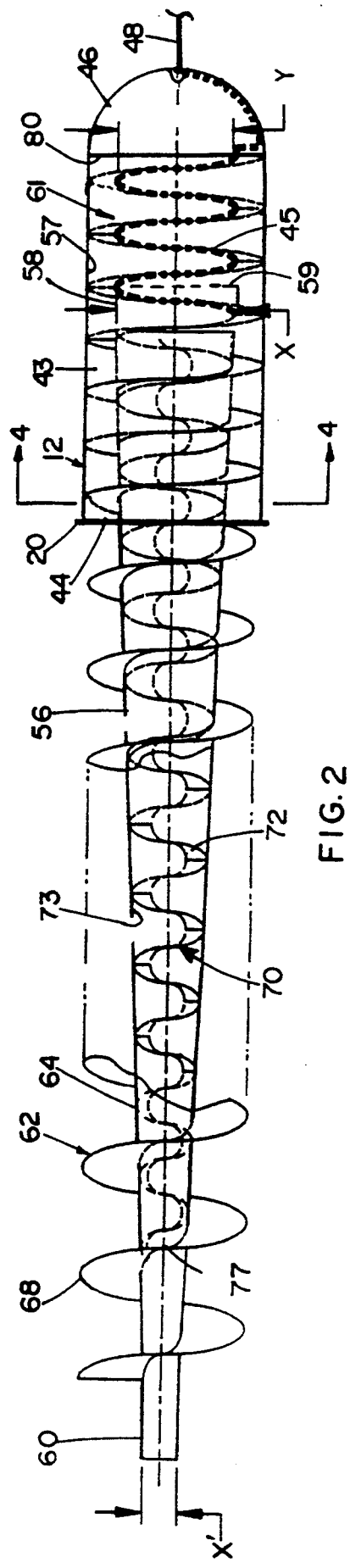
FIG. 2
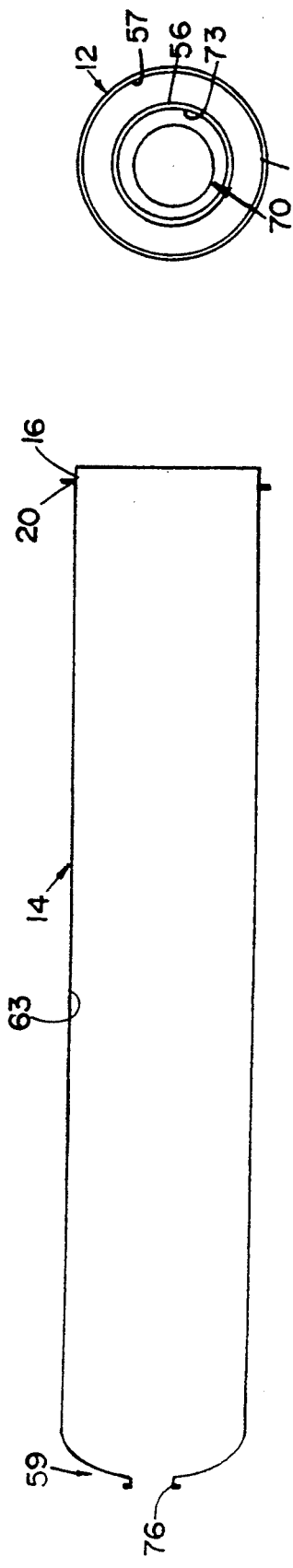
FIG. 4
FIG. 3

APPARATUS AND METHOD FOR PREPARATION FOR SEPARATION, RECOVERY, AND RECYCLING OF MUNICIPAL SOLID WASTE AND THE LIKE

CROSS-REFERENCE TO RELATED APPLICATIONS

This application is a continuation-in part- of U.S. patent application Ser. No. 07/692,550, filed Apr. 29, 1991.

FIELD OF THE INVENTION

This invention relates to a method and apparatus for recovering valuable materials (glass, plastics, metals, cellulose, etc.) from municipal agricultural and other waste including solid waste (MSW) and converting paper, cardboard, food waste, etc. to a usable cellulose material.

BACKGROUND OF THE INVENTION

One of the major problems confronting our society today is the generation of wastes. Landfilling had become the method of choice with the prevailing mentality being "Out of Sight-Out of Mind!" The most commonly considered alternatives to landfills are mass incineration of municipal waste and its related activity, the production of refuse derived fuel (RDF). Incineration and refuse derived fuel produce a variety of pollutants that cause respiratory discomfort and disease. These pollutants are caused by incomplete combustion of municipal solid waste and the combustion of plastics.

It is known that municipal solid waste contains a tremendous amount of materials of value, when recycled. Environmentalist and public officials view the recycling of these materials as the most desirable method of waste disposal; however, present recycling efforts have reduced the volume of MSW by less than ten percent.

In light of the shortcomings, both technically and economically of mass-burn and refuse derived fuel and with an awareness of the wealth of recyclable materials being lost in landfills, a method of easily classifying and separating recyclables is needed.

In my prior U.S. Pat. No. 4342,830, dated Aug. 3, 1982, steam treatment of MSW is disclosed wherein the sterilized and softened organics are forced through perforations upon sudden release of pressure whereby inorganics and certain synthetics, such as metal cans, glass, plastic containers and the like, are left behind. This method included the addition of significant quantities of water to the wastes and thus required substantial energy consumption in the form of steam to heat the water/waste slurry and to force the resultant sterile and softened organics through the perforations in a singular step. The plastics recovered which were suitable for recycling were generally less than 2% of the waste by weight and were generally severely contaminated with softened organics and dirt. The inorganic materials such as ferrous and non-ferrous metals were also similarly contaminated, making these products less desirable for recycling. The glass components were both broken and contaminated.

In my prior U.S. Pat. No. 4,450,495, dated Jun. 10, 1085, steam treatment was again disclosed wherein the amount of water added prior to steam treatment was insignificantly reduced to conserve energy consumed and to reduce the moisture content of the softened organic fraction to in the order of 60% by weight. There was no method of controlling final moisture content of the softened organic fraction; therefore, making final separation more difficult and decreasing the desirability of the plastics, and inorganic recyclables. The internal steam pressure requirements in combination with the resultant temperatures and the necessary period of time it took to cook and sterilize the waste material and soften the organic matter also caused a melting of many of the plastics and significant heat distortion of most other plastics as in the previous U.S. Pat. No. 4,342,830.

Also in my prior U.S. Pat. No. 4,844,351 a method for separation, recovery, and recycling of plastics from municipal solid waste was disclosed wherein mixed wastes including various plastic elements were subjected to mechanical agitation and heat distortion. The waste were introduced into a processing unit having a means for heating and a means for agitating the wastes. By this method, the plastics were recovered as a mixture that may be recycled. The processing unit included an inclined, cylindrical, rotatable vessel having closing members (hatches) at opposite ends thereof. A plurality of spaced plates, inclined in a common plane and secured to the internal shell of the cylinder extending into the interior of the cylinder. The plates were arranged to provide a lifting and mixing action to the waste material; however, because of the arrangement of the plates, only a small degree of mixing of the materials could be accomplished.

The above noted defects of the prior art is overcome by the method and structure of the present invention which provides for twice "extruding" the waste materials in a pressurized, heated container. Such double extrusion process provides shear stresses which substantially "fluidizes" the organic material thus making it more easily separated from the inorganic materials such as glass, metals, etc.

SUMMARY OF THE INVENTION

It is the object of the present invention, therefore to provide a method and apparatus for the efficient preparation of recyclable materials for separation and recovery.

It is another object of the present invention to provide such method and apparatus which facilitates the separation and recovery of the recyclable :materials in a rapid, facile, and inexpensive manner.

In accordance with the objects, the present invention contemplates the provision of apparatus and method for providing a substantially continuous extruding action on waste materials, which are continuously fed into a heated and pressurized processor chamber of a rotating pressure vessel. In the method and apparatus as set forth herein, direct extrusion occurs as a result of an extruder mechanism which continuously forces the waste materials through a first processing chamber having a first restricted area therein to a conditioning chamber and then forces the materials from the conditioning chamber though a second processing chamber having a second restricted area and then to a conveyor belt where it is carried away to further classification.

BRIEF DESCRIPTION OF THE DRAWINGS

FIG. 2 is a diagrammatic elevational view of the process vessel of FIG. 1 with the aft stationary section removed. FIG. 2 illustrates an extruder apparatus mounted for rotating therein. Sparger lines are shown extending into the forward rotatable conditioning section. The extruder apparatus is shown to include both internal and external vanes.

FIG. 3 is an elevational view of the aft stationary section of the process vessel of FIG. 1.

FIG. 4 is a sectional view taken along line 4—4 of FIG. 2.

DESCRIPTION OF THE PREFERRED EMBODIMENTS

Figure 1:
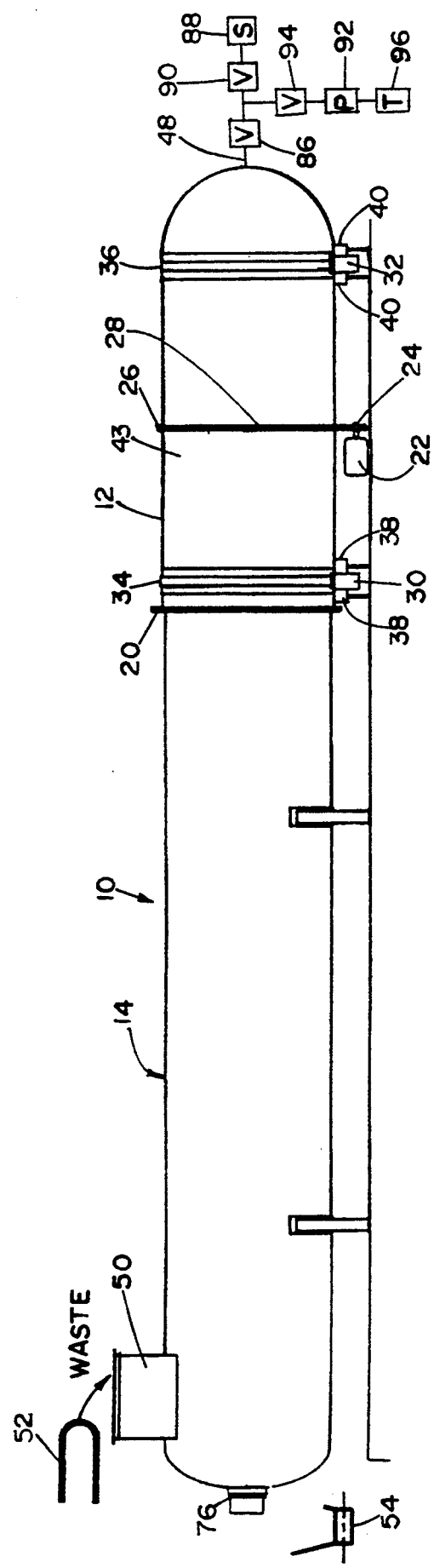
FIG. 1 is an elevational view of the process vessel of the present invention illustrating a rear stationary section, a forward rotatable waste conditioning section and feed and discharge mechanism for the process vessel according to the principles of the present invention.

As seen in FIG. 1, a pressure vessel 10 is shown to include a forward rotatable section 12 and an aft stationary section 14. Aft section 14 is provided with a forward portion 16 (FIG. 3) which projects into and is rotatably supported in a rear portion 18 of forward section 12. A seal 20 is provided around forward portion 16 at the juncture of the two sections. Such seals are well known. Forward section 12 (FIG. 1) is rotated by a motor 22 having an output sprocket 24 coupled to a sprocket 26 by a chain 28. Sprocket 26 is disposed around the periphery of the forward section 12.

Rotatable section 12 is shown to be rotatably supported in two sets of wheels 30 and 32 (only one wheel of each set is shown) which respectively support a pair annular members 34 and 36 which are secured around the periphery of vessel section 12. Sets of roller bearings 38 and 40 are provided for respectively supporting each wheel of each set of wheels 30 and 32.

Rotatable forward section 12 is shown to include a conditioning chamber 43 having an open end 44 and a closed end 46. Open end 44 receives end 16 of aft section 14 and closed end 44 receives a sparger line 48 as shown in Figure and described hereinafter.

The waste is diagrammatically shown in FIG. 1 as being introduced in the process unit 10 though an open hopper 50 by means of a conveyor system 52. A second conveyor system 54 may be used to carry the treated waste material to the remaining process equipment shown in FIG. 5. The feed and discharge systems as shown rely substantially upon plugs being formed by the compressed materials in the conditioning chamber to retain heat, pressure and moisture; however, other means such as rotary air lock valves as disclosed in my copending patent application, Ser. No. 07/693,550 can be used, if desired.

As seen in FIG. 1, section 14 is mounted stationary to the floor or other structures and will not rotate. This section 14 supports the aft end of section 12 which is the rotating member of the assembly. The rotating section 12 of the assembly is rotated at a predetermined speed to fix residence time in the chamber.

Sections 12 and 14 have an internal conical tube 56 (FIG. 2) with diameter of "X" on one end 58 of the tube and a diameter of "X" on a second (discharge) end 60 of the tube. This conical tube 56 is provided with an extrusion member (flighting) 62 on the exterior 64 thereof for directing flow to the closed end 46 of section 12 (conditioning chamber 43). Flighting 62 includes blades 68 and the spacing of the extruder blades 68 is set at a predetermined interval and can be varied as determined. Conical tube 56 is also provided with a second extrusion member (flighting) 70 on the interior surface 73 of the tube 56 for directing flow away from the closed end of the conditioning chamber 46 and toward the discharge end 59 of the chamber 14. Flighting 70 includes blades 72 and the spacing of the blades 72 of extruder member (flighting) 70 is set at a predetermined interval and can be varied as determined. Tube 56 is fixed to the interior of rotatable section 12 by means of the blades 68 which are secured to tube 56 and to the interior of forward section 12. Tube 56, therefore, rotates at the same speed and direction as the rotating section 12. The portion of flighting 62 that extends into the stationary section 14 is fixed only to conical tube 56 and is provided sufficient space between the edge of the blades and the interior wall 63 of the stationary section 14 to allow free rotation. The discharge end 60 of the conical tube 56 protrudes through an opening 76 of the stationary section 14 and is equipped with a mechanical seal 76 (FIG. 1). The flighting 70 inside the conical tube 56 is stopped (as shown at 77) a predetermined distance from the discharge end 58 of the tube 56 to form a plug and increase the pressure exerted on the processed materials.

The forward end 58 of internal conical tube 56 is shown to be discontinued at 59 which is a predetermined distance from the closed end 46 of section 12. The extruding members 68 of flighting 62 is continued beyond the point 59 to provide a space 61 in which a plug may be formed by the waste material. Line 48 is mounted on the inner tip of the blades 68 in the conditioning chamber 43 (section 12) and is provided with spaced openings 45 through which steam and/or conditioning agents if needed may be directed into the interior of the vessel. The line 48 acts as a sparger for distributing steam throughout the conditioning chamber 43 and/or a collection system for removing excess moisture. This steam line 48 is shown to be positioned in chamber 43 but may be continued along the interior of the conical tube 56 or along the extruder members 62 if necessary for addition heat and moisture or for the removal of additional moisture.

Once the waste material is introduced into the stationary process chamber 14, it is picked up by helical configuration of the extruder member (flighting) 62 and extruded to the conditioning chamber 43. Decreasing space between the internal conical tube 56, and the internal wall of 57 of section 12 combined with the decrease spacing of the extruder blades apply a shearing force to the heated and pressurized waste product. As the waste product passes the end 58 of the internal conical tube 56 into space 61 of the conditioning chamber 43, the pressure is released causing partial fibrillation of the material.

Once the material is introduced into the conditioning chamber 43, additional heat and moisture may be introduced or moisture may be removed through the steam sparger line as necessary. While in the space 61 of the conditioning chamber the material is further extruded by these blades 68 which extend past end 58 of tube 56 to the closed end of the vessel and is subjected to further pressure and shear and is reversed by a baffle 80 provided between the end 58 of the tube 56 and the closed end 46 of the vessel. (Baffle 80 increases efficiency of operation, but omission will not prevent operation). The waste material is then squeezed (extruded) through the space "Y" between the tips of the blades 68.

Additional material being forced into the conditioning chamber and the arrangement of the extruder members and baffles in the conditioning chamber force the material to flow to the opening "X" in the internal conical tube 56, where the material is picked up by the internal extrusion member 70 and extruded toward the discharge end 60 of the internal conical tube 56. The decreasing diameter of the internal conical tube 56 and the arrangement of the extruder blades 72 once again apply a shearing force to the pressurized and heated waste material. This process causes any paper (cellulose) that was not fibrillated by the first two stages of the chamber to be torn apart by the compression and shear action of the extrusion process. The material is then forced out the discharge end of the section 14.

The arrangement of the internal tube 56 and its extruding members 62 and 70 allow for the reversal of the flow of the material while extrusion is accomplished.

To provide a means for desired "conditioning" of waste material, the line (sparger line) 48 is mounted on the inner tip of the blades 42, as shown in FIG. 1, or along the inner wall of the vessel shell and is provided with spaced openings 45 (FIG. 1) through which steam is directed into the interior of vessel 10. The sparger line 48 acts as a sparger for distributing steam, acid or caustic, water and surfactants throughout the vessel 10 and a collection system for moisture upon application of a vacuum on the vessel 10. The external portion of the sparger line 48 is secured to a rotary coupling or valve (indicated as 86 in FIG. 1) which secures the internal steam line to an external source of steam 88 through a valve 90. Such rotary valves or couplings are well known in the art. When acting as a moisture collecting system for moisture, the steam line 48 is secured to a vacuum pump 92 through a valve 94, which evacuates moisture from the interior of vessel 10, and pumps the moisture to holding tanks 96 for reuse in the process vessel 10; therefore allowing the control of moisture content of the processed cellulose to vary according to the desired end product.

Figure 5:
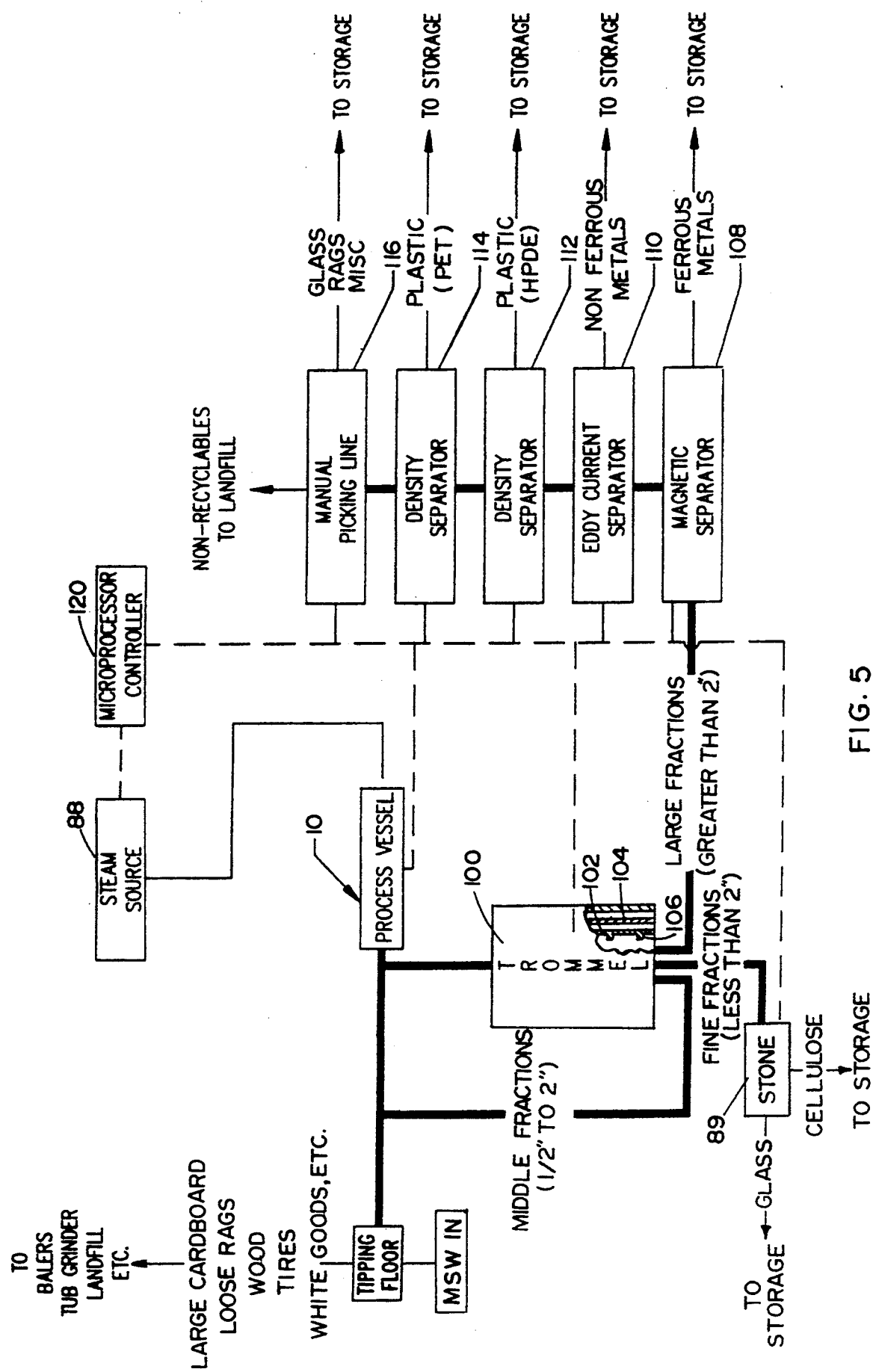
FIG. 5 is a flow diagram of the system of the present invention.

As shown in FIG. 5, the treated product is discharged onto a conveyor and is conveyed to a rotating trommel 100 for further classification. The rotating trommel 100 has two perforated screens 102 and 104 of different size (for example ½"and 2") openings to classify the material by size. "Fingers" 106 (flexible cords, approximately 6" Long) are attached to the inner screen in a hexagonal pattern, extending inward toward the center of the trommel to hold sheet material such as film plastic, rags, etc. away from the inner screen to improve efficiency. Efficiency of the trommel would also be improved by applying an internal pressure of approximately 15 psig to the interior on the trommel. This trommel would also be suitable for "MRF" applications. The "inner" screen (2" openings) retains the "large fractions" (over 2") of waste while passing "middle and fine fractions" (smaller than 2") to the outer screen. The "outer" screen (½" openings) retains the "middle fractions" of waste (½" to 2"), while passing the "fine fractions" (less than ½") to a conveyor belt.

The "fine fractions" (less than ½") consist of primarily cellulose and small pieces of broken glass with other small pieces of inorganic materials. These "fine fractions" are conveyed to a stoner (fluidized bed separator) 89 or other means of classification and are separated for further use.

The "middle fractions" consist of primarily small pieces of unfibrillated paper, bottle caps, rocks, small bits of masonry, etc. The "middle fractions" may be conveyed to the batch hopper to be repossessed in the process vessel. This reprocessing cycle is interrupted periodically to remove non-processable items.

The "large fractions" consist of cans, bottles, plastics and other items larger than 2". The "large fractions" are conveyed to a magnetic separator 108 to remove ferrous metal, an eddy current separator 110 to remove non-ferrous metal, a density separator 112 to remove HDPE plastics, a density separator 114 to remove PET plastics, and a manual picking line 116 to remove items previously missed and rags, large pieces of glass, and other valuables. The order of these items is not important and any separation step can be deferred to the manual picking line or additional separation equipment such as a rag picker can be added.

Valuable recyclables are efficiently recovered by the process and apparatus of the present invention. The resulting organic material can be 50% to 65% cellulose and has a value as a fuel for combustion, food for microorganisms, construction material such as wallboard, fabric, etc., compost or bio-chemically converted to gas and liquid fuels such as methane or ethanol.

Apparatus and method of the present invention finds application in landfill mining which is the process of excavating a landfill and uses conventional surface mining technology which includes placing the landfill material on vibratory screens or rotary trommels. The upper (inner) screen has larger openings than the lower (outer) screen, which allows the smaller material, such as solid to fall through both screens, while middle size items are retained by the screen with smaller openings. Most materials falling through the larger opening screen and retained by the smaller opening screen are recyclables such as metals, glass, plastics and some organic materials. Materials retained by the larger opening screen typically includes fabrics, building materials, wood, etc. and MSW contained in plastic bags. The recoverable material may be processed by application of the principles of the present invention.

It is to be understood that a vibrating screen assembly similar to that described in my copending application, Ser. No. 07/692,550 may be used to separate the waste components directly out of the process vessel in lieu of the rotary trommel, if desired.

If desired, the system may be microprocessor controlled as disclosed in my copending application, Ser. No. 07/692,550. As seen in FIG. 5, microprocessor 120 is connected to and actuates to all valves, motors, and separators. The actuators of the valves, speed control on the motors and safety controls for complete shutdown are all operated by signals from a microprocessor 120 in a manner well known in the art. Actuators of valves are controlled by the microprocessor 120 to open and close at desired times. Motor speed, direction, and operation times are controlled by the microprocessor 120. In FIG. 1, the source of pressure, heat and moisture is shown to be the steam source for the process vessel; however, other sources may be resorted to, if desired. In FIG. 5, specific separation equipment is shown employed for each recyclable or group of recyclables, which are well known in the art; however, specific items may be added or deleted as desired.

In one example of the present invention, the precess vessel was 40'-0" long, 8"-0" diameter, and included conical ends with approximately 3'-0" diameter closures. The vessel was designed for 100 psig steam and was similar to the vessel 10 shown in FIG. 2 and FIG.

3. The vessel was rotated at approximately 8 rpm and pressurized to approximately 45 psig with steam and no additional added water in approximately 45 minutes. After venting the vessel for approximately 45 minutes the vessel was emptied and the contents observed.

The resulting cellulose material had the appearance of being finely fibrillated instead of pulped. It had a moisture content in the order of 40% and was easily separated from inorganics such as glass and metals. Plastics such as HDPE (milk containers with a low melting point) were distorted but easily recovered. Other plastics with higher melting points such as PET showed little distortion. Plastic film materials were distorted into loose balls and easily recoverable.

It should be readily apparent from the foregoing, that the applicant provides a method and apparatus for processing municipal solid waste (including food waste such as fish, etc., agricultural products, etc.) which offers significant improvement over the current state of the art. It should also be apparent specific embodiments of my invention are disclosed, various modifications will be apparent to those skilled in the art that is within the spirit and scope of my invention.

I claim:

1. A method of processing waste materials for recycling thereof comprising:
   introducing a predetermined quantity of waste materials into a process vessel;
   pressurizing and heating said waste materials to a predetermined pressure and temperature for a processing period lasting a predetermined period of time, said waste materials being continuously fed into said heated and pressurized process vessel for processing thereof;
   applying a first extruding action to said waste materials while subjecting said waste material to said predetermined pressure and temperature, said extruding action applying a shearing force to said waste materials, applying a second extruding action to said waste materials while subjecting said waste materials to said predetermined pressure and temperature, said extruding action and simultaneously applying a second shearing force to said waste materials;
   recovering said mixed waste materials from said process vessel for classification; and
   separating and recovering the recyclable materials from classified materials.

2. A method as set forth in claim 1 wherein said waste materials are continuously directed out of said vessel responsive to the processing thereof.

3. A method set forth in claim 2 wherein said processed material is classified responsive to exiting said vessel so that the recyclable wastes may be separated from the non-recyclable wastes.

4. A method as set forth in claim 3 wherein said vessel includes a conditioning chamber at one end thereof and said processing includes the steps of applying said first extruding action to said waste material while directing said waste materials in a first direction into said conditioning chamber for conditioning of said waste materials and applying said second extruding action to said waste materials while directing said waste materials in a second direction out of said pressure vessel.

5. A method as set forth in claim 4 including the steps of introducing said solid wastes into said conditioning chamber and conditioning said waste materials by at least pressurizing and heating said conditioning chamber while rotating said vessel and applying said extruding actions to said solid waste material.

6. A method as set forth in claim 5 including the steps of venting said vessel, drawing moisture from the processed said materials, and recovering said processed materials.

7. Apparatus for separation and recovery of recyclable materials from solid waste materials comprising:
   a rotatable pressure vessel having a first open end and a second closed end;
   means for pressurization and heating of said solid waste materials in said pressure vessel;
   extruder means carried in said vessel for applying first and second extruding actions to said solid waste materials while said vessel is in a heated and pressurized state, said extruder means being further disposed for expelling the processed solid waste materials from said vessel responsive to exposing said solid waste materials to heat, pressurization and said first and second extrusion actions for a predetermined time period;
   said extruder means including a hollow shaft having a first extruder means mounted on its outer surface and a second exturder means mounted on its internal surface, said first extruder means disposed for rotating in a first direction, said first extruder means disposed for directing said waste materials in a first direction while applying a shearing force thereto and second extruder means disposed for directing said waste materials in a second direction and out of said pressure vessel while simultaneously applying a second further extruding action to said waste materials.

8. Apparatus as set forth in claim 7 wherein said pressure vessel is provided with first and second sections disposed in communication, said extruder means being supported in said first and second section.

9. Apparatus as set forth in claim 8 wherein said first section of said pressure vessel is rotatably secured to said second section of said pressure vessel.

10. Apparatus as set forth in claim 8 wherein said first section of said hollow, tapered shaft is provided with larger external and internal diameters than said second section of said tapered shaft, said first section of said shaft being enclosed in and secured to said first rotatable section of said pressure vessel whereby said tapered shaft and said first section are simultaneously rotated.

11. Apparatus as set forth in claim 8 wherein said first extruder means is defined by a single tapered helical member mounted on said external surface of said shaft.

12. Apparatus as set forth in claim 8 wherein said second extruder means is defined by a single tapered helical member mounted on said internal surface of said tapered shaft.

13. Apparatus as set forth in claim 8 including sparger line means communicating into said first section and selectively connected to a source of waste conditioning additives and steam, and a vacuum source, and valve means for selectably connecting said sparger line to said waste conditioning additives and steam and said vacuum source.

14. Apparatus as set forth in claim 13 including baffle means carried in said rotatable first section to reverse the flow direction of said waste material in said pressure vessel.

15. Apparatus as set forth in claim 13 including processed waste material receiving means in communication with said pressure vessel for receiving processed materials for classification thereof.

16. Apparatus as set forth in claim 15 wherein said processed waste receiving means is a rotary trommel, said rotary trommel having internally extending fingers to increase efficiency of classification of materials according to size, whereby the recyclable materials may be recovered from the classified materials.

17. Apparatus as set forth in claim 7 including microprocessor means for controlling the sequence and time of operation of said apparatus for the processing of said waste materials.

18. A method of processing waste materials for recycling thereof comprising:
   introducing a quantity of waste materials into a process vessel;
   pressurizing and heating said waste materials to a predetermined pressure and temperature for a processing period lasting a predetermined period of time;
   applying a first extruding action to said waste materials while directing said waste materials in a first direction in said process vessel and subjecting said waste materials to said predetermined pressure and temperature, said first extruding action disposed for application of a first shearing force to said waste materials responsive to movement of said waste materials in said first direction, applying a second extruding action to said waste materials while subjecting said waste materials to said predetermined pressure and temperature, said second extruding action disposed for directing said waste materials in a second direction and out of said pressure vessel while simultaneously applying a second shearing force to said waste materials;
   recovering said waste materials from said process vessel for classification; and
   separating and recovering the recyclable materials from classified materials.

* * * * *